US010681024B2

(12) United States Patent
Badri et al.

(10) Patent No.: US 10,681,024 B2
(45) Date of Patent: Jun. 9, 2020

(54) SELF-ADAPTIVE SECURE AUTHENTICATION SYSTEM

(71) Applicant: Konica Minolta Laboratory U.S.A., Inc., San Mateo, CA (US)

(72) Inventors: Subramanyam Badri, Livermore, CA (US); Sarma Sista, Menlo Park, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 157 days.

(21) Appl. No.: 15/610,558

(22) Filed: May 31, 2017

(65) Prior Publication Data

US 2018/0351925 A1    Dec. 6, 2018

(51) Int. Cl.
*H04L 29/06*    (2006.01)

(52) U.S. Cl.
CPC ............ *H04L 63/06* (2013.01); *H04L 63/083* (2013.01); *H04L 63/0853* (2013.01); *H04L 63/0861* (2013.01); *H04L 63/105* (2013.01); *H04L 2463/082* (2013.01)

(58) Field of Classification Search
CPC ... H04L 63/06; H04L 63/083; H04L 63/0853; H04L 63/0861; G06K 9/00926
USPC .......................................................... 726/6
See application file for complete search history.

(56) References Cited

U.S. PATENT DOCUMENTS

| 6,615,182 | B1* | 9/2003 | Powers ............ G06Q 10/06398 705/7.42 |
| 9,201,953 | B2* | 12/2015 | Yang ................. G06F 17/30867 |
| 9,514,293 | B1* | 12/2016 | Moritz .................. H04L 63/102 |
| 2002/0169965 | A1* | 11/2002 | Hale ....................... H04L 9/088 713/182 |
| 2004/0039909 | A1 | 2/2004 | Cheng |
| 2006/0021003 | A1 | 1/2006 | Fisher et al. |
| 2006/0102717 | A1* | 5/2006 | Wood ..................... G06Q 10/10 235/382 |
| 2015/0046711 | A1* | 2/2015 | Slaby ..................... H04L 63/08 713/170 |

(Continued)

FOREIGN PATENT DOCUMENTS

EP    2 933 981    10/2015

*Primary Examiner* — Khalil Naghdali
(74) *Attorney, Agent, or Firm* — Buchanan Ingersoll & Rooney PC (57) ABSTRACT

A method, a system, and a non-transitory computer readable program code are disclosed for authenticating users for services. The method includes registering one or more users in an authentication system; assigning a score index to each of the one or more users in the authentication system for one or more services, the score index representing a security level and corresponding authentication required to access each of the one or more services; inputting each request for services from the one or more users into the authentication system to continuously update the score index for each of the one or more users, each of the requests including one or more authenticators or biometric identifiers for the requested service; and requesting the one or more users to register one or more additional authenticators or biometric identifiers with the authentication system upon the score index for a user reaching of a predefined threshold value.

20 Claims, 9 Drawing Sheets

(56) References Cited

U.S. PATENT DOCUMENTS

| | | | |
|---|---|---|---|
| 2016/0005050 A1* | 1/2016 | Teman | G06K 9/627 |
| | | | 705/317 |
| 2017/0034183 A1 | 2/2017 | Enqvist et al. | |
| 2017/0230379 A1* | 8/2017 | Morelli, Jr. | H04L 63/105 |
| 2018/0295128 A1* | 10/2018 | Drake, II | H04L 63/0861 |

* cited by examiner

| Service | Security level | Default authenticator | Available authenticators | | | | |
|---|---|---|---|---|---|---|---|
| | | | Smart Card | Voice recognition | Fingerprint | Iris | Face detection |
| Service 1 | High | Iris | O | O | O | O | O |
| Service 2 | Low | Smart card | O | O | | | O |
| Service 3 | Medium | Voice recognition | O | O | O | | |
| Service 4 | Medium | Face detection | O | | O | O | O |

| Authenticator | Grading (depends on security features) |
|---|---|
| Smart card | 1 (lowest security) |
| Fingerprint | 2 |
| Face detection | 3 |
| Iris | 4 |
| Voice recognition | 4 (highest security) |

| User ID | Security clearance assigned | Default service | User location rights | User score index | Smart Card | Voice recognition | Fingerprint | Iris | Face detection |
|---|---|---|---|---|---|---|---|---|---|
| User A | High | Service 2 | Access any location | 30 | o | o | o | o | o |
| User B | Medium | Service 1 | Access after additional authentication | 20 | o | o | o |  | o |
| User C | Low | Service 3 | Limited to certain sites | 40 |  | o |  |  |  |
| User D | Medium | Service 4 | Access any location | 60 | o | o | o |  | o |
| User E | Low | Service 2 | Limited to assigned site | 10 | o | o | o |  |  |
| User F | High | Service 1 | Limited to certain sites | 80 | o | o | o | o | o |

FIG. 7

| Entry | User ID | Service | Authenticator(s) used | Access time | Access point GPS coordinates (Lat, Long) | IP address | MAC address | Access grant |
|---|---|---|---|---|---|---|---|---|
| 1 | UserA | Service1 | Face detection Iris | 2/20/2017 1:00PM | 40.741895, -73.989308 | 163.18.1.10 | DC:6D:B9:52:18:4E | Granted |
| 2 | UserB | Service2 | Smart card | 3/1/2017 7:32AM | 37.5629917, -122.3255254 | 200.16.4.33 | DC:6D:B9:52:10:22 | Granted |
| 3 | UserD | Service3 | Voice recognition | 3/2/2017 12:00AM | 34.0522342, -118.2436849 | 10.10.1.1 | DC:6D:B9:52:26:8C | Requested for additional authenticator |
| 4 | UserD | Service3 | Voice recognition Fingerprint | 3/2/2017 12:02AM | 34.0522342, -118.2436849 | 10.10.1.1 | DC:6D:B9:52:26:8C | Granted |
| 5 | UserC | Service4 | Voice recognition | 3/4/2017 2:09AM | 45.572717, -143.3654314 | 172.10.33.23 | DC:6D:B9:52:61:8D | Denied |
| 6 | UserF | Service3 | Smart card | 3/5/2017 9:01AM | 34.0522342, -118.2436849 | 10.10.23.67 | DC:6D:B9:52:64:91 | Requested for additional authenticator |
| 7 | UserF | Service3 | Smart card Voice recognition Fingerprint | 3/5/2017 9:01AM | 34.0522342, -118.2436849 | 10.10.23.67 | DC:6D:B9:52:64:91 | Granted |

FIG. 8

| Service | Previous security level | Current security level |
|---|---|---|
| Service 2 | Low | High |
| Service 3 | Medium | Low |
| Service 4 | Medium | High |
| Service 1 | High | High (additional monitoring) |

FIG. 9

| User ID | User scale index calculation | System detection factors | System recommendations |
|---|---|---|---|
| User B | 20->60 | Too many random location access | Increase request for multi-factor authentication May need new authenticator registration |
| User C | 40->10 | Access limited to assigned site or service | Low authentication requirement |
| User F | 80->30 | Consistent success in usage of multi-factor authentication | Reduce authentication requirements for certain sites |
| User A | 30->70 | Frequent access to high risk services | Restrict access to normal business hours |

FIG. 10

| Item | User ID | Service | Authentication | Access Time | Access Point GPS coordinates (Latitude, Longitude) | IP address | MAC address | Access Grant |
|---|---|---|---|---|---|---|---|---|
| 1 | User B | Service 4 | Smart card | 3/7/2017 8:32AM | 45.572717, -143.3654314 | 172.10.33.23 | DC:6D:B9:52:26:8D | Requested for additional authenticator |
| 2 | User B | Service 4 | Smart card Fingerprint | 3/7/2017 8:35AM | 45.572717, -143.3654314 | 172.10.33.23 | DC:6D:B9:52:26:8D | Granted |
| 3 | User D | Service 2 | Face detection Smart card | 3/9/2017 11:03AM | 37.5629917, -122.3155254 | 200.16.4.33 | DC:6D:B9:52:10:2 | Denied |
| 4 | User C | Service 3 | Voice recognition | 3/15/2017 12:30PM | 34.0622342, -118.2436849 | 10.10.23.67 | DC:6D:B9:52:64:91 | Granted |
| 5 | User F | Service 1 | Iris Fingerprint | 4/2/2017 3:02PM | 40.741895, -73.989308 | 163.18.1.10 | DC:6D:B9:52:18:4E | Granted |
| 6 | User A | Service 1 | Voice recognition Iris | 4/4/2017 5:09AM | 40.741895, -73.989308 | 163.18.1.10 | DC:6D:B9:52:18:4E | Denied |
| 7 | User A | Service 1 | Voice recognition Iris Smart card | 4/5/2017 11:09AM | 40.741895, -73.989308 | 163.18.1.10 | DC:6D:B9:52:18:4E | Granted |

SELF-ADAPTIVE SECURE AUTHENTICATION SYSTEM

FIELD OF THE INVENTION

The present disclosure relates to a self-adaptive secure authentication system with biometric authenticators based on multi-level and multi-factor authentication process, and more particularly to a method and system, which has a self-adaptive secure authentication system, which learns from the user authentication requirements and usage to create a secure authentication system.

BACKGROUND OF THE INVENTION

Current Information Technology (IT) environment utilize many techniques to authenticate a user, such as, for example, using proximity cards, RFID cards, ID/Passwords, various biometric information, Smart cards, RSA tokens, and in some cases advanced methods like IRIS recognition, face detection, and voice recognition. The current methods may create a secure system but also has limitations and add burden on the user to remember and/or save secure information like PINs, passwords, challenge questions, and/or pictures. They are also vulnerable to issues like biometric information compromised, stolen cards, human errors, and passwords lacking security. The advanced solutions can impose additional burdens on the user and/or becomes more expensive due to lack of coordination of the backend systems or unified IT environment solutions.

Accordingly, there is need for an intelligent system that is not only effective but adaptive to meet the security requirements of ever changing complex IT requirements, Enterprise IP protection, Productive user environment and other advanced enterpriser IT situations. In accordance with an exemplary embodiment, a system and method are disclosed, which can solve these issues with an intelligent and advanced system.

SUMMARY OF THE INVENTION

It would be desirable to have a system or method, which can provides a secure authentication system, which supports a multi-level and/or a multi-factor authentication system, and is enhanced through a self-learning process.

In accordance with an exemplary embodiment, a self-adaptive secure authentication system that provides a secure user authentication by learning usage details of users and combining it with several other related information. In accordance with an exemplary embodiment, the system can define the authentication requirements for the IT service users based on a learning process and combines the authentication requirements with enterprise IT requirements to ensure users meet the security requirements of a particular organization.

A method is disclosed of authenticating users for services, the method comprising: registering one or more users in an authentication system; assigning a score index to each of the one or more users in the authentication system for one or more services, the score index representing a security level and corresponding authentication required to access each of the one or more services; inputting each request for services from the one or more users into the authentication system to continuously update the score index for each of the one or more users, each of the requests including one or more authenticators or biometric identifiers for the requested service; and requesting the one or more users to register one or more additional authenticators or biometric identifiers with the authentication system upon the score index for a user reaching of a predefined threshold value.

A non-transitory computer readable program code configured to execute a process of authenticating users for services is disclosed, the process comprising: registering one or more users in an authentication system; assigning a score index to each of the one or more users in the authentication system for one or more services, the score index representing a security level and corresponding authentication required to access each of the one or more services; inputting each request for services from the one or more users into the authentication system to continuously update the score index for each of the one or more users, each of the requests including one or more authenticators or biometric identifiers for the requested service; and requesting the one or more users to register one or more additional authenticators or biometric identifiers with the authentication system upon the score index for a user reaching of a predefined threshold value.

An authentication system configured to grant authentication to a user of a service is disclose, the authentication system comprising: a server having a processor configured to: register one or more users in an authentication system; assign a score index to each of the one or more users in the authentication system for one or more services, the score index representing a security level and corresponding authentication required to access each of the one or more services; input each request for services from the one or more users into the authentication system to continuously update the score index for each of the one or more users, each of the requests including one or more authenticators or biometric identifiers for the requested service; and request the one or more users to register one or more additional authenticators or biometric identifiers with the authentication system upon the score index for a user reaching of a predefined threshold value.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
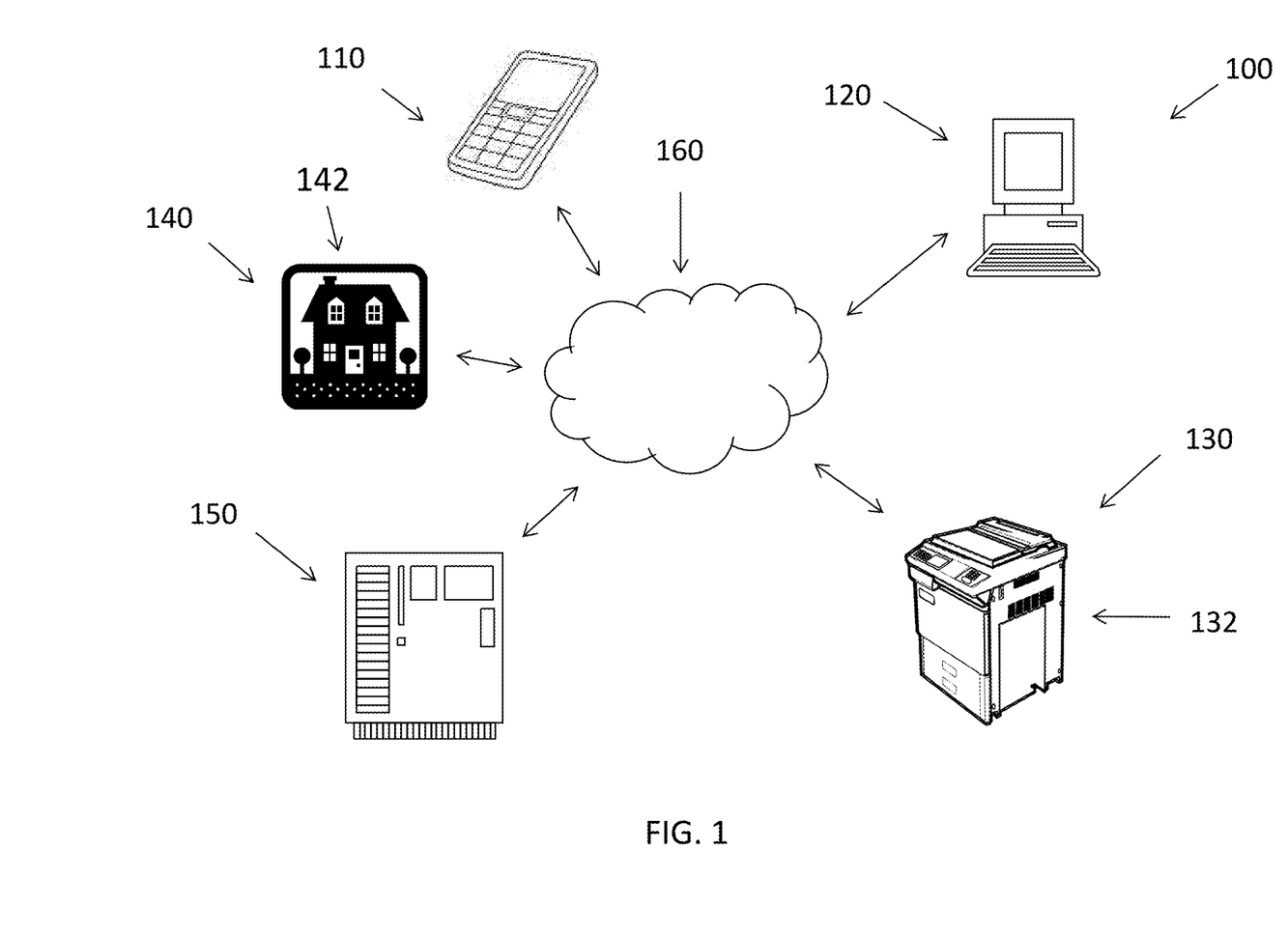
FIG. 1 is an illustration of a system in which a method and system having a self-adaptive secure authentication system can be implemented in accordance with an exemplary embodiment

FIG. 1 is an illustration of a system 100 in which a self-adaptive secure authentication system can be implemented in accordance with an exemplary embodiment. The system 100 can include, for example, one or more client devices 110, 120, at least one host device 130, for example, in the form of a printer or a multifunction printer device (MFP) 132, a home or office security system 140 within a home or office 142, and at least one server 150. In accordance with an exemplary embodiment, the one or more client devices 110, 120, the at least one host device 130, the home or office security system 140, and the at least one server 150 are connected via a network connection 160. The at least one server 150 is configured to interact with an authentication module or system on the one or more client devices 110, 120, the host device 130, and/or the home or office security system 140.

In accordance with an exemplary embodiment, each of the one or more client device 110, 120, the at least one host device 130, and the home or office security system 140 includes at least one authentication application (or authentication module) for receiving an authenticator and/or biometric identifier, which can authenticate a user. In accordance with an exemplary embodiment, biometric identifiers can include distinctive, measurable characteristics used to label and describe or identify an individual, including a metric related to human characteristics. For example, biometric identifiers can include physiological characteristics of an individual including but not limited fingerprints, palm veins, face recognition, DNA (or deoxyribonucleic acid), palm print, hand geometry, iris recognition, retina, and/or odor/scent.

In accordance with an exemplary embodiment, once the user has been authenticated, the user can have access to applications and/or data on the device 110, 120, 130, or can be allowed entry, for example, into a home or office 142. The at least one authentication application for receiving the authenticator(s) and/or biometric identifier(s) can include, for example, a keypad for a username and password ("password"), and/or a sensor, scanning device, or an electronic reader, which can read and/or obtain data from, for example, a proximity cards, a radio-frequency identification (RFID) card, smart cards, wearable devices, RSA tokens, and/or biometric identifiers. In accordance with an exemplary embodiment, each of the devices and/or systems 110, 120, 130, 140 can be access by the user via at least one authenticator and/or a biometric identifier, and preferably, at least two or more authenticators and/or biometric identifiers. For example, each of the one or more devices and/or systems 110, 120, 130, 140 can include at least one authenticator or biometric identifier, which can be, for example, a keypad, a sensor, scanning device, or an electronic reader, for authenticating an authenticator and/or a biometric identifier as disclosed herein.

In accordance with an exemplary embodiment, the one or more devices 110, 120, 130, which may be embodied by a smart phone, a smart tablet, a personal computer, a camera, a router, a medical device or apparatus, or a MFP (or printer), can generate print data usable in a printer, a print server, or multi-function peripheral (MFP) 132. In accordance with an exemplary embodiment, for example, the client devices 110, 120 can include a printer driver program (hereinafter, sometimes simply referred to as a printer driver), and the devices 110, 120 can use the function of the printer driver to generate a print job including the data of print conditions to be applied at the time of image formation, and image data, and sends the generated print job to the host device 130, for example, which can be an MFP or printer 132.

In accordance with an exemplary embodiment, each of the devices and/or systems 110, 112, 130, 140 can include a processor or central processing unit (CPU), and one or more memories for storing software programs and data (such as files to be printed). The processor or CPU carries out the instructions of a computer program, which operates and/or controls at least a portion of the functionality of the devices 110, 120, 130, 140. Each of the devices and/or systems 110, 120, 130, 140 can also include an operating system (OS), which manages the computer hardware and provides common services for efficient execution of various software programs. For example, the software programs can include application software, for example, for managing an authentication module and/or biometric identifier, and/or printer driver software, for example, for the client devices 110, 120.

In accordance with an exemplary embodiment, the at least one host device 130 can be a multi-function peripheral (MFP) or printer 132, which can be connected to the one or more client devices 110, 112 via the communications network 160. In accordance with an exemplary embodiment, the multi-function peripheral (MFP) 132 can include at least a copy function, an image reading function, a facsimile (fax) function, and a printer function, and forms an image on a sheet based on a print job (print instruction) received, from the one or more client devices 110, 120, for example, a client device 110, 120 in the form of a personal computer, a mobile device, or a personal digital assistant.

In accordance with an exemplary embodiment, the one or more client devices 110, 120 can be configured to submit print jobs to the at least one multifunction printers or printers 132 by transmitting data representing the documents to be printed and information describing the print job. The at least one multifunction printer or printer 132 can include a printer controller (or firmware), a memory section preferably in the form of a hard disk drive (HDD), an image processing section (or data dispatcher), a print engine, and an input/output (I/O) section.

In accordance with another exemplary embodiment, the host device 130 can be a medical device or a medical apparatus, which are used, for example, for diagnostic and/or therapeutic purposes. Examples of medical devices or medical apparatuses can include medical imaging devices, which can obtain, for example, radiological, angiographic, sonographic, and/or tomographic images. Alternatively, the host device 130 can be, for example, a back-end database, or enterprise database system, which can be accessed by the one or more users indirectly through an external application, for example, through the client device 110, 120.

In accordance with an exemplary embodiment, the home or office security system 140 can include a method or system, which authenticates a user for accessing the home or office 142, for example, via a door to the building, a floor or room of the home or office, via, for example, an elevator, and/or any other secured room. In addition, the method and systems as disclosed herein can be used in securing device, for example, security systems, and computers, within the user's home or office 142.

In accordance with an exemplary embodiment, the at least one server (or authentication server) 150 can include a processor or central processing unit (CPU), and one or more memories for storing software programs and data. The processor or CPU carries out the instructions of a computer program, which operates and/or controls at least a portion of the functionality of the at least one server 150. The server 150 can also include an operating system (OS), which manages the computer hardware and provides common services for efficient execution of various software programs. For example, in accordance with an exemplary embodiment, the at least one server 150 can be configured to interact with the authentication modules, for example, passwords and/or proximity cards, and the biometric identifiers.

In accordance with an exemplary embodiment, the one or more clients 110, 120, the at least one host device 130, for example, in the form of a printer 132, the home or office system 140, and the at least one server 150 are preferably connected via the Internet or communication network (or network) 160. The communication network 160 may include, for example, a conventional type network, wired or wireless, and may have any number of configurations, such as a star configuration, token ring configuration, or other known configurations. The communication network 160 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, other generations), and/or any other interconnected data path across which multiple computing nodes may communicate.

In accordance with an exemplary embodiment, data may be transmitted in encrypted or unencrypted form between the devices and/or systems 110, 120, 130, 140, and 150 using a variety of different communication protocols including, for example, various Internet layer, transport layer, or application layer protocols. For example, data may be transmitted via the network 160 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

Figure 2:
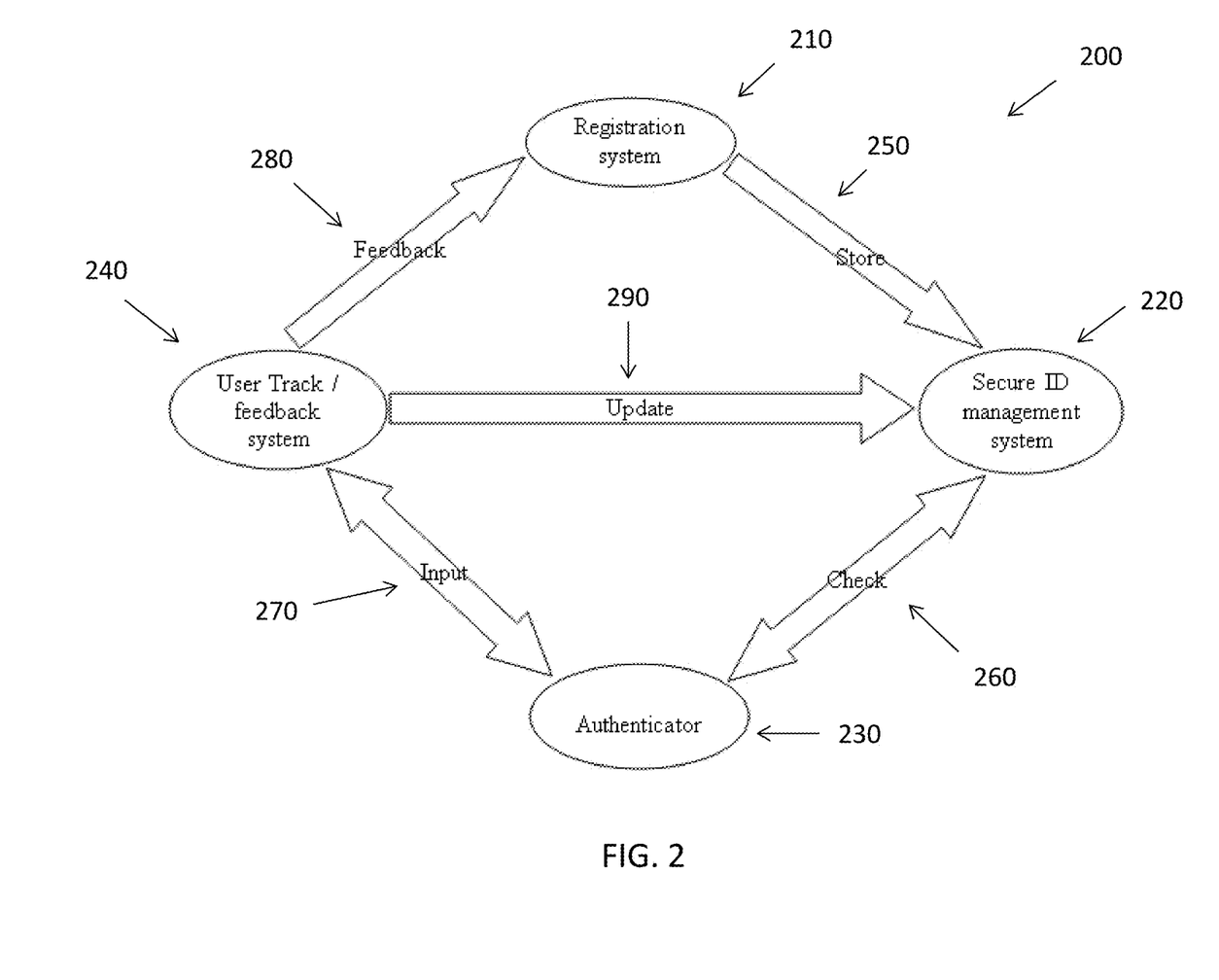
FIG. 2 is an illustration of a self-adaptive secure authentication system in accordance with an exemplary embodiment.

FIG. 2 is an illustration of a self-adaptive secure authentication system 200 in accordance with an exemplary embodiment. As shown in FIG. 2, the system 200 can include a registration system 210, a secure identification (ID) management system 220, an authenticator 230, and a user track/feedback system 240. In accordance with an exemplary embodiment, the registration system 210, the secure identification (ID) management system 220, the authenticator 230, and the user track/feedback system 240 are software systems, which are hosted by the at least one server (or authentication server) 150.

In accordance with an exemplary embodiment, each of the client devices and/or systems 110, 120, 130, 140, which can be collectively referred to as biometric authentication devices, can be registered in the registration system 210 using a software application hosted on each of the devices and/or systems 110, 120, 130, 140. As set forth above, each of the biometric authentication devices 110, 120, 130, 140 can authenticate a user using at least one authenticator or biometric identifier. For example, as set forth above, the at least one authenticator or biometric identifier can be a username and password, a proximity card, a fingerprint, an iris scanner, blood veins detection, voice recognition, and/or face recognition. The software on each of the devices or systems 110, 120, 130, 140 interacts with the biometric authentication devices 110, 120, 130, 140 to obtain and register the biometrics of one or more users in the registration system 210, which can be hosted for example, on the at least one server (or authentication server) 150.

In accordance with an exemplary embodiment, for example, the biometrics of each of the one or more users can be obtained on the client device or system 110, 120, 130, 140, in which access will be granted, or alternatively, on another client device and/or system 110, 120, 130, 140, and the biometrics can be transferred to or accessed by the client device or system 110, 120, 130, 140, in which the user is attempting to access.

In accordance with an exemplary embodiment, during the registration process, a biometric template can be created for each user using the biometric devices 110, 120, 130, 140. Once the biometric template is created by the user on the biometric device, the biometric template is sent to the authentication server 150 via the communication network 160. In accordance with an exemplary embodiment, a software application on the server 150 processes the biometric templates received from each user and can create a unique signature for each of the users. The unique signature for each of the users can be securely stored within the server 150, for example, in a database in the memory of the server 150, for example, on the secure ID management system 220 (FIG. 2). In accordance with an exemplary embodiment, the unique signature for each of the one or more users can be used to grant or deny access to the one or more services as disclosed, for example, in FIG. 3.

In accordance with an exemplary embodiment, as an initial requirement, an administrator can set a minimum required level of biometric authentication requirements for each user and/or for each service, for example, obtaining access to a home, a building, or an office, and/or unlocking access to, or accessing devices, systems, or applications, which can include, for example, software applications, databases or database management systems, and/or machines, for example, medical equipment, x-ray machines, and scanners. For example, in accordance with an exemplary embodiment, depending upon the service access location, multi-level biometric authentication requirements can be changed, which the administrator can set, for example. In addition, for example, for accessing an office or building, the biometric authentication requirements can requires multi-level authentication, for example, two or more authenticators and/or biometric identifiers, and for accessing the server room can also require multi-level authentication, for example two or more authenticators and/or biometric identifiers, which can be the same and/or different than the two or more authenticator and/or biometric identifiers required to access the office or building.

In accordance with an exemplary embodiment, for example, the same person for accessing a system in that same building may require only a single level biometric authentication. However, the number of authenticators and/or biometric identifiers for each home, building, or office and systems within the home, building, or office, and for each user, can be based a plurality of factors, which the system 200 as shown in FIG. 2 can determine based on the level of authentication required by the user. For example, if the system 200 determines that the user is frequently accessing one or more services within a short period of time, the system 200 may request during a first request (or first visit) to access the service, a multi-level biometric authentication process is performed, for example, two or more authenticators and/or biometric identifiers, and after granting access to the user based on the multi-level biometric authentication process in which two or more authenticator and/or biometric identifiers are required, during a subsequent request for access to the service, the access level for the user may be changed to single level of biometric authentication, for example, a single authenticator or a single biometric identifier.

In accordance with an exemplary embodiment, in some cases, if a user fails once to authenticate with authenticator or biometric identifier, and later if the user is able to succeed (or access the device) with the requested authenticator or biometric identifier, the system 200 can ask for multi-level authentication process, i.e., two or more authenticators and/or biometric identifiers to ensure that the system or device has not been compromised during the authentication process.

As shown in FIG. 2, the system 200, which is preferably a software module or application hosted on the server 150, can include the registration system 210, the secure ID management system 220, the authenticator system 230, and the user track/feedback system 240. In accordance with an exemplary embodiment, for each of the one or more users, the system 200 can require that each of the users register at least one biometric identifier, which is stored 250 in the secure ID management system 220. In accordance with an exemplary embodiment, each of the users preferably registers at least two biometric identifiers with the registration system 210, which stores the at least two biometric identifiers in the secure ID management system 220. In accordance with an exemplary embodiment, each of the one or more biometric identifiers can be input from one or more of the biometric authentication devices 110, 120, 130, 140, and provided to the server 150 via the communication network 160. Alternatively, the system 200 can be configured such that one or more of the biometric identifiers are input directly into the server 150. For example, the server 150 can have a keypad, a sensor, and/or a scanning device for obtaining the biometric identifiers from each of the users. In accordance with an exemplary embodiment, the keypad, the sensor, and/or the scanning device can be a graphical user interface (GUI) or display panel on the server 150 or connected to the server 150 via a wired or wireless connection.

In accordance with an exemplary embodiment, each of the one or more users once registered in the system 150 can be tracked using the user track/feedback system 240, which is configured to receive input or data from the authenticator (or authenticator module), which receives data from each of the one or more biometric authentication devices 110, 120, 130, 140, each time the user is authenticated. For example, a user may access a building or office 142 using a proximity card on the home or office system 140, for example, upon arrival at work in the morning and can may access his client device 120 (or computer) at his desk using a username and password. In accordance with an exemplary embodiment, this information can be conveyed from the corresponding biometric devices 120, 140 to the authenticator system 230, which provides the input, for example, information, or data to the user track/feedback system 240.

Figure 5:
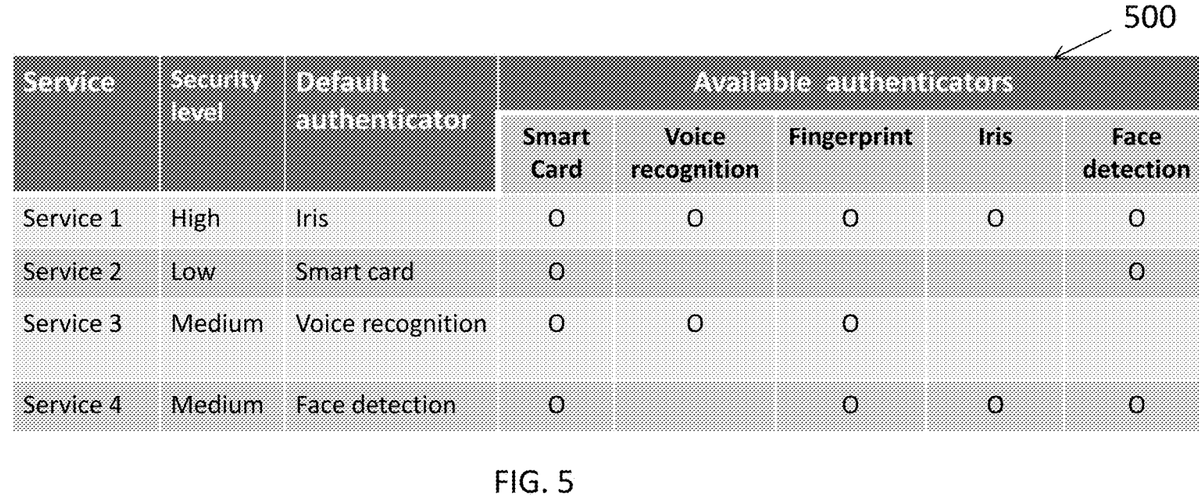
FIG. 5 is an illustration of an example of a table of a security setup of a given enterprise service in accordance with an exemplary embodiment.

In accordance with an exemplary embodiment, each of the authentications performed by the user in various locations, for example, accessing the home or office security system 140, or the one or more biometric authentication devices 110, 120, 130, are captured and/or forwarded by the biometric authentication devices 110, 120, 130, 140 to the server 150. Since each of the authentications can be performed at different times, each of the events and/or data points is received by the authenticator system 230 on the server 150 and input 270 into the user track/feedback system 240. In accordance with an exemplary embodiment, each user can be assigned a default score index based on one or more attributes as disclosed herein. Once the input 270 is received by the user track/feedback system 240, the user track/feedback system 240 can change the score index for each user from the previous default score index. For example, the previous default score index can be changed based on an actual location or expected location in which access may be requested by the user. In accordance with an exemplary embodiment, the score index can be defined as an authentication level, for example, which can require two or more biometric identifiers, for example, fingerprint, Iris recognition, and face detection, as shown in FIG. 5.

In accordance with an exemplary embodiment, the score index can include, for example, information about a user, such as what time he/she arrives and/or leaves their home or office, each of the applications and resources (for example, services) accessed from their home and/or office, and times, dates, and/or frequency of in which the applications and resources are requested. In addition, the score index can be based on a location of the request, for example, based on an IP address assigned and received from the client device 110, 120 or the host device 130 in the request received by the system 200 being hosted on the server 150.

In accordance with an exemplary embodiment, the score index for each of the users can be continuously updated through a self-learning process, for example, a machine learning process (or algorithm) or artificial intelligence application based on the user activities. In accordance with an exemplary embodiment, for example, the user track/feedback system 240 can be provide a self-learned continuous feedback 280 to the registration system 210, updates 290 to the secure ID management system 220, and input 270 to the authenticator system 230 based on the activities of each of the users as disclosed herein. For example, in accordance with an exemplary embodiment, the score index can be generated based on, for example, an initial registration of a minimum number of authenticators and/or biometric identifiers, and based on the self-learning process (for example, machine learning algorithm or artificial intelligence), which can consider, for example, user location, logon services, and frequency of services accessed. In accordance with an exemplary embodiment, once the score index is generated, additional authenticators and/or biometric identifiers can be requested, for example, upon reaching a predefined threshold value, which can be calculated through the continuous self-learning process as disclosed herein.

In accordance with an exemplary embodiment, when a user's score index reaches the predefined threshold value, the user may be requested to input one or more additional authenticators or biometric identifiers. For example, once the predefined threshold value has been exceeded, the user may be tagged, and will be required to provide additional authenticators or biometric identifiers be input into the registration system 210 of the server, as shown, for example, in FIG. 5. For example, as shown in FIG. 5, the authentication levels can include for each of the one or more services, for example, a Smart Card, voice recognition, fingerprint, iris recognition, and/or face detection. In addition, for example, the frequency in which the user is attempting to access the service may not be within a normal use or standard protocol, or is determined to be not appropriate for the user, may also cause the score index to exceed the predefined threshold.

In accordance with an exemplary embodiment, unless the user registers for additional authenticator(s) and/or biometric identifier(s) through the registration system 210, the system 200 will not allow the user to authenticate (or access) one or more of the biometric authentication devices 110, 120, 130, 140. As shown in FIG. 2, once an authenticator and/or biometric identifier is received on the authenticator system 230, the authenticator and/or biometric identifier is checked 260 by the secure ID management system 220 to determine if the credentials or biometric identifier matches a stored authenticator and/or biometric identifier for the user and corresponding to a requested service. In accordance with an exemplary embodiment, the authenticator system 230 and the secure ID management system 220 can be a secure transaction, for example, a key exchange or encoded key exchange.

In accordance with an exemplary embodiment, the requested service may require an authenticator and a biometric identifier, or two or more biometric identifiers. In addition, as disclosed herein, the index score is continuously updated based on the input 270 received by the authenticator system 230, such that a request for a service by a user may only require an authenticator and/or a biometric identifier. However, for example, based on the self-adaptive feature, for example, as a result of a machine-learning feature in the user track/feedback system 240, the next request for a same or similar service from the same user may require two or more biometric identifiers. In addition, in accordance with an exemplary embodiment, the user track/feedback system 240 can update the secure ID management system 220 to require credential and/or biometric identifiers that can be randomly chosen.

Figure 7:
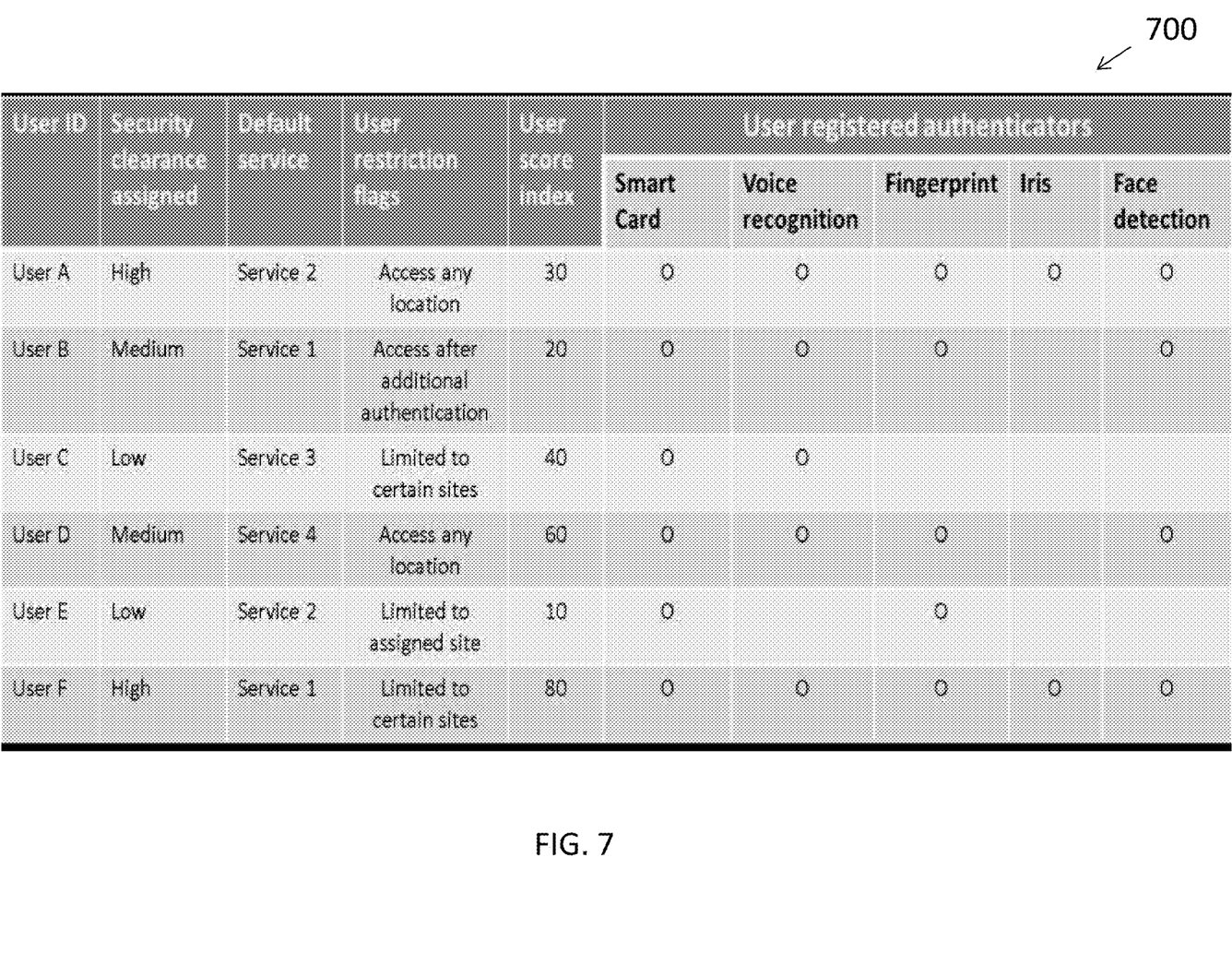
FIG. 7 is an illustration of an example of a table of enterprise users' registration or given usage scenario in accordance with an exemplary embodiment.

In accordance with an exemplary embodiment, once the user registers for additional biometric authenticators as shown in FIG. 7, the system 200 will allow the user to authenticate one or more of the biometric authentication devices 110, 120, 130, 140, based on the newly defined multi-level authentication requirements. For example, as shown in FIG. 7, for each of the one or more users, the registration system 210 can store information including whether or not certain biometric identifiers, for example, a fingerprint or iris have been obtained from the one or more users.

Figure 3:
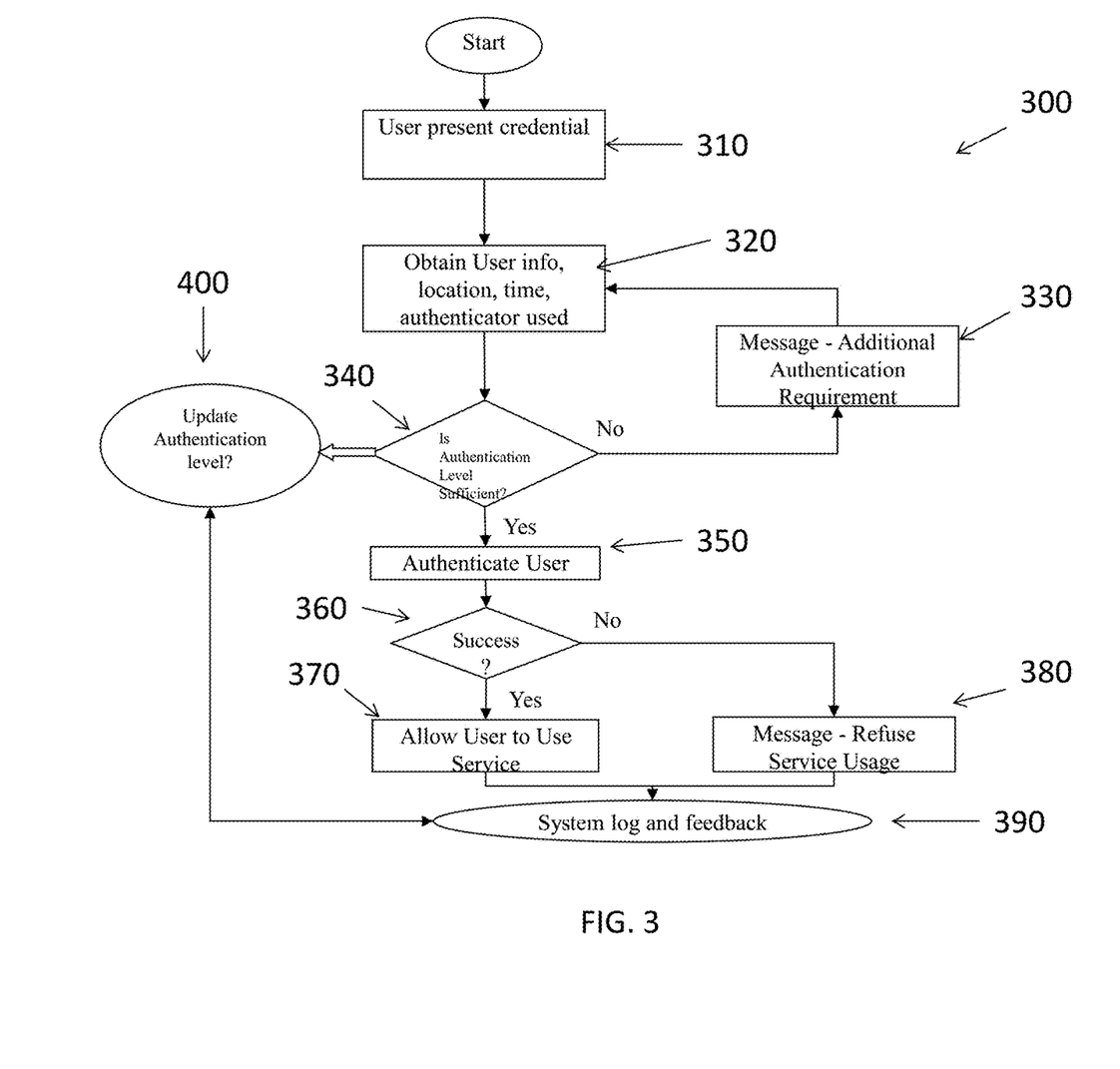
FIG. 3 is a flow chart of a multi-level authentication system in accordance with an exemplary embodiment.

FIG. 3 is a flow chart 300 of a multi-level authentication system in accordance with an exemplary embodiment. As shown in FIG. 3, in step 310, the user presents his or her credential to the biometric authentication device to access a service, for example, the service can be access to client or host device 110, 120, 130, or a home, office, or building 140 in which the user has input an authenticator and/or biometric identifier(s), for example, username and passcode, a proximity card, and/or one or biometric identifiers. In step 320, for example, the user information, location, time, and authenticator used is received from the biometric authentication device 110, 120, 130, 140 on the server 150 and input into the secure ID management system 220.

In step 340, the secure ID management system 220 determines if the received authenticator and/or biometric identifier is a level sufficient to grant access to the user for the requested service. If the received authenticator and/or biometric identifier(s) is sufficient, the user in step 350 is authenticated based on the authenticator or biometric identifier received from the user. In step 360, if the authenticator and/or biometric identifier(s) matches or provides the necessary credentials, in step 370, the user is granted access to the requested service. However, if the authenticator and/or biometric identifier(s) received from the user do not match or provided the necessary credentials, in step 370, the process continues to step 380 where the user is denied access to the requested service. In accordance with an exemplary embodiment, the information received during the authentication process is input into the user track and feedback system 240 to update the score index for the user.

In accordance with an exemplary embodiment, in step 340, if the secure ID management system 220 determines based on the score index for the user that the authenticator and/or biometric identifier(s) received are not sufficient to meet the level required by the system 200 to provide access to the service, in step 330, the user receives a message, for example, on a graphical user interface (GUI) or display of the biometric authentication device 110, 120, 130, 140. In accordance with an exemplary embodiment, the message can indicate that "Additional Authenticator Requirement" is needed and in step 380, the user is denied access to the requested service. In accordance with an exemplary embodiment, the user can input the requested biometric identifiers into the registration system 210, and the process as shown in FIG. 3 can be repeated with the new authenticators and/or biometric identifiers to determine if access is granted or not to the user to the requested service.

Figure 4:
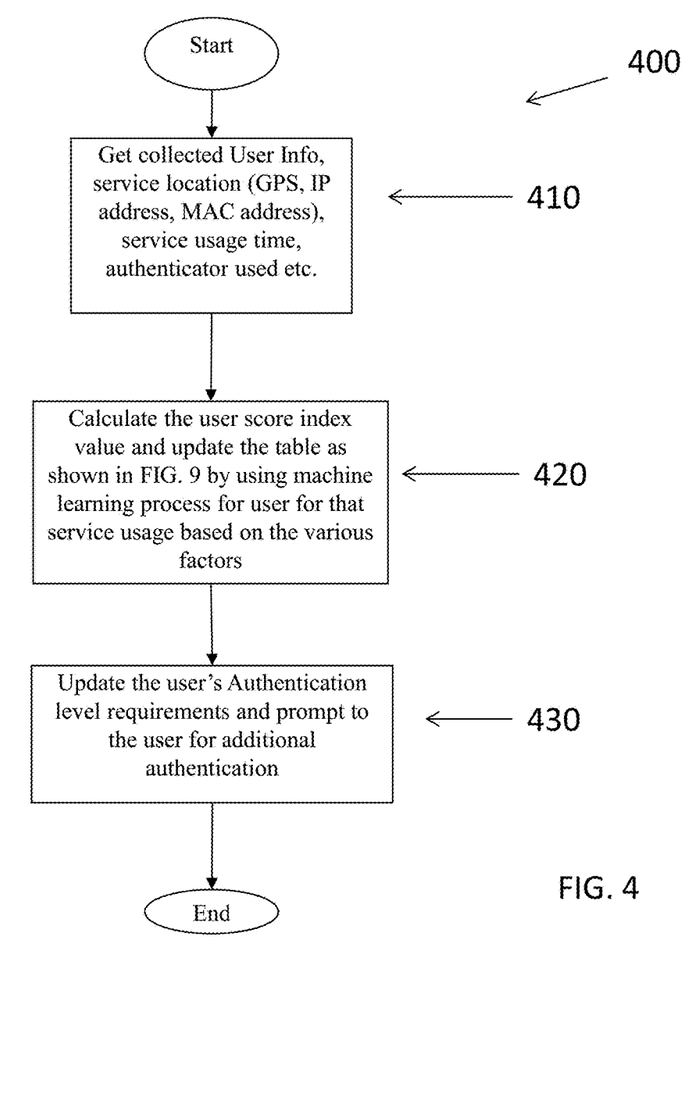
FIG. 4 is a flow chart of a self-Adaptive Authentication level requirements learning process in accordance with an exemplary embodiment.
Figure 9:
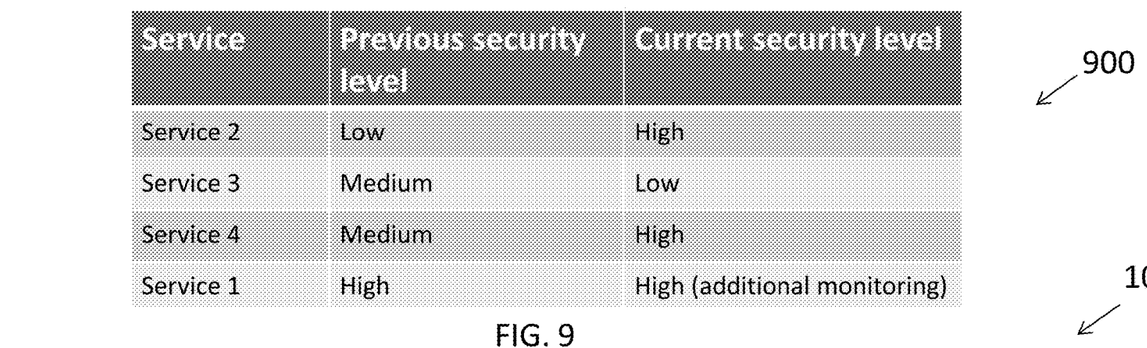
FIG. 9 is an illustration of an example of a table of changes in service security levels due to change in circumstances or requirements in accordance with an exemplary embodiment.

FIG. 4 is a flow chart 400 of a self-adaptive authentication level requirements learning process in accordance with an exemplary embodiment. As shown in FIG. 4, in step 410, the registration system 210 collects user information, service location (for example, via Global Positioning System (GPS), IP address, MAC address), service usage time, authenticators used, etc. In step 420, the secure ID management system can calculate a user score index value and can be updated, for example, using a machine learning process for the user for the service usage based on the various factors. For example, in accordance with an exemplary embodiment, FIG. 9 is an illustration of examples of a change in a service security level due to a change in circumstances or requirements. In step 430, the user's authentication level requirements can be updated and the user can be prompted to submit additional authentication, if necessary.

Figure 6:
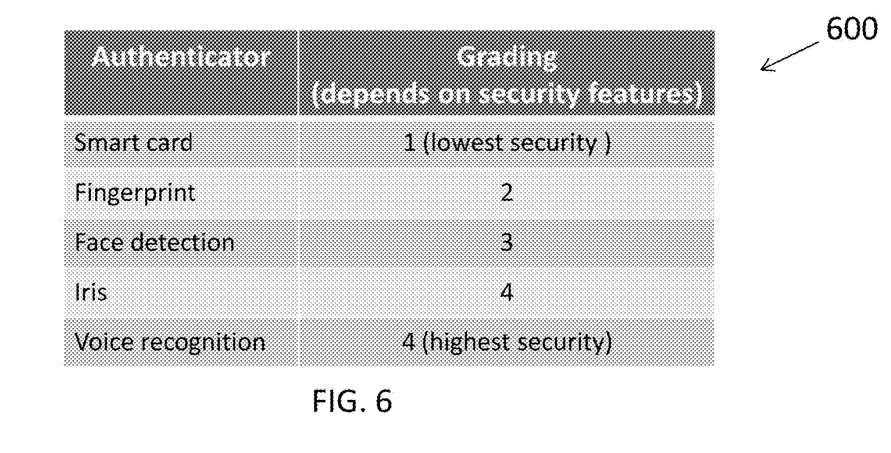
FIG. 6 is an illustration of an example of a table with authenticators for a given enterprise service and a grading of the authenticators in accordance with an exemplary embodiment.

In accordance with an exemplary embodiment, for example, any enterprise environment can predefine their security levels as listed, for example, in the table 500 as shown in FIG. 5. As an initial requirement, for example, an administrator can set the minimum required level of biometric or other authentication requirements for each user, for example, as listed in the table 700 as shown in FIG. 7. In addition, each user (User A-User B) can be assigned a security clearance level, a default service, user restriction flags, and a user score index. For example, for each service listed in table 500 of FIG. 5, (for example, accessing any location, access after additional authentication, limited to certain sites, limited to assigned side, and limited to certain sites including access to a building and/or unlocking a system), a default score index value can be assigned to each of the user as shown in table 700 with corresponding user registered authenticators. In addition, an enterprise can define the priority or security level grading for each authentication device or mechanism as shown, for example in table 600 of FIG. 6.

In accordance with an exemplary embodiment, depending upon the service access location, the requirements could be changed or set by administrator to multi-level or multi-factor authentication. For example, accessing the building require may require single factor authentication and accessing the server room requires multi-level authentication. In addition, the same user may need multi-factor authentication for accessing a system in different location but could simply use single level biometric authentication at designated location.

Figure 8:
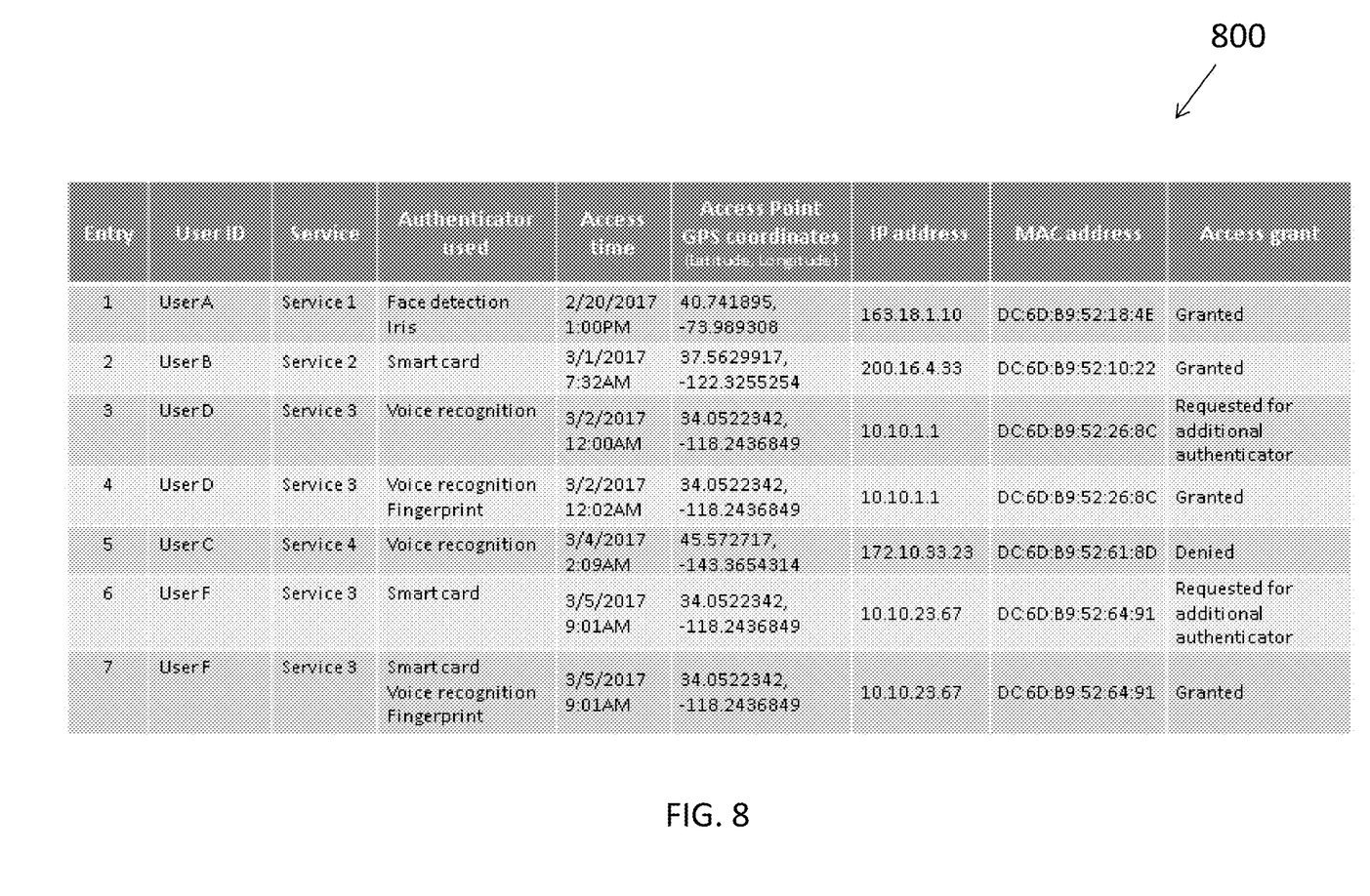
FIG. 8 is an illustration of an example of a table of user access logs in accordance with an exemplary embodiment.

In accordance with an exemplary embodiment, based on multiple factors like type of service, location (for example GPS coordinates, MAC address, IP address), authenticators used, frequency of service usage, time of the service usage, system will decide what level of authentication is required by the user for specific service usage shown as an example in table 800 and FIG. 8.

When system finds user authentication level is not sufficient, the system will then ask for additional authentication, for example, as listed in table 800 at service location 3. For example, In the system log entries 3 and 4, when user D tried to authenticate at 12:00 AM using voice detection authenticator, system requested for additional fingerprint authentication from the user for granting the access. Similarly, User C in entry 5 is denied access to service 4 since the user may not be able to meet the authentication requirements.

Another example scenario could be a case of user accessing some services very frequently within a short period as defined by default setting in the server, the authentication system may request multi-level biometric authentication during initial accesses and later it may change the requirement to single level biometric authentication.

In some cases, if user failed once to authenticate with one authentication mechanism but succeeds later, the system will request for multi-level authentication to make sure there is no compromise in the security or authentication level.

If system detects any service usage anomalies by the users, then system will increase the Authentication level requirements across the system and reduce it after some period of time, when the service anomalies are considered fixed or reduced. For example, in some cases, if user is accessing services more often via remote services such as VPN, the system may increase the score index of that particular user irrespective of the security level and prompt for additional authentication types.

Figure 10:
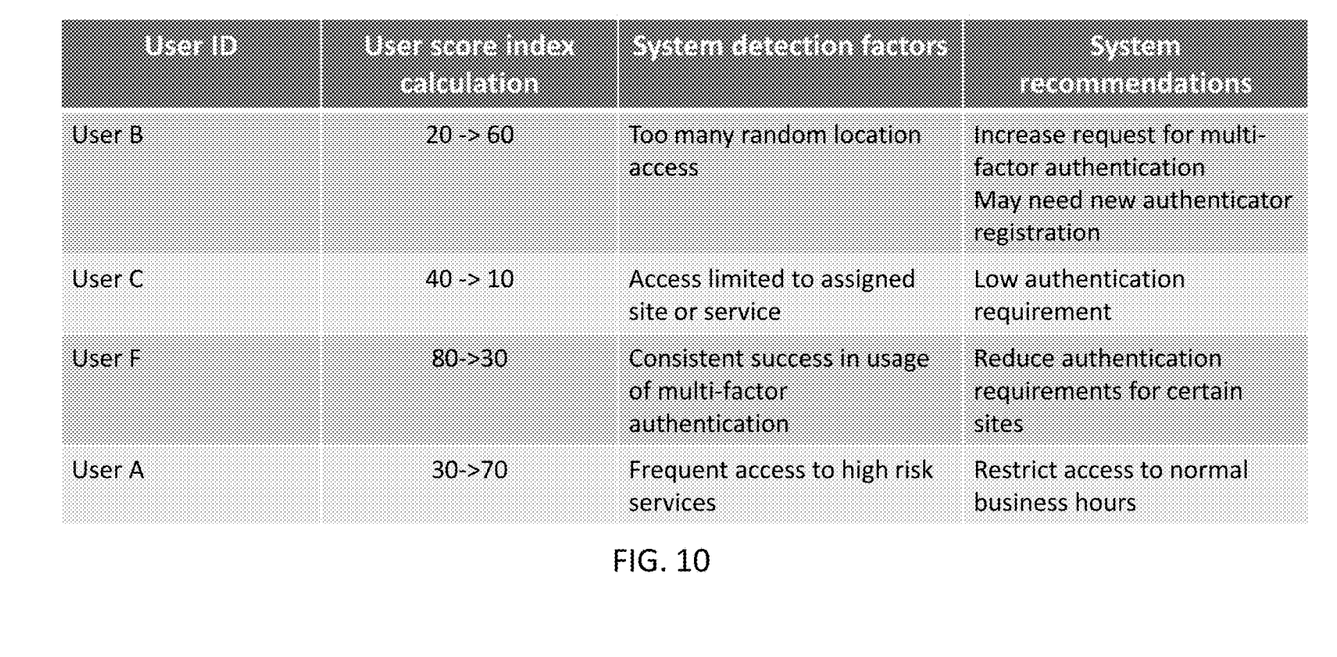
FIG. 10 is an illustration of an example of a table of a change in user authentication levels based on system analysis in accordance with an exemplary embodiment.
Figure 11:
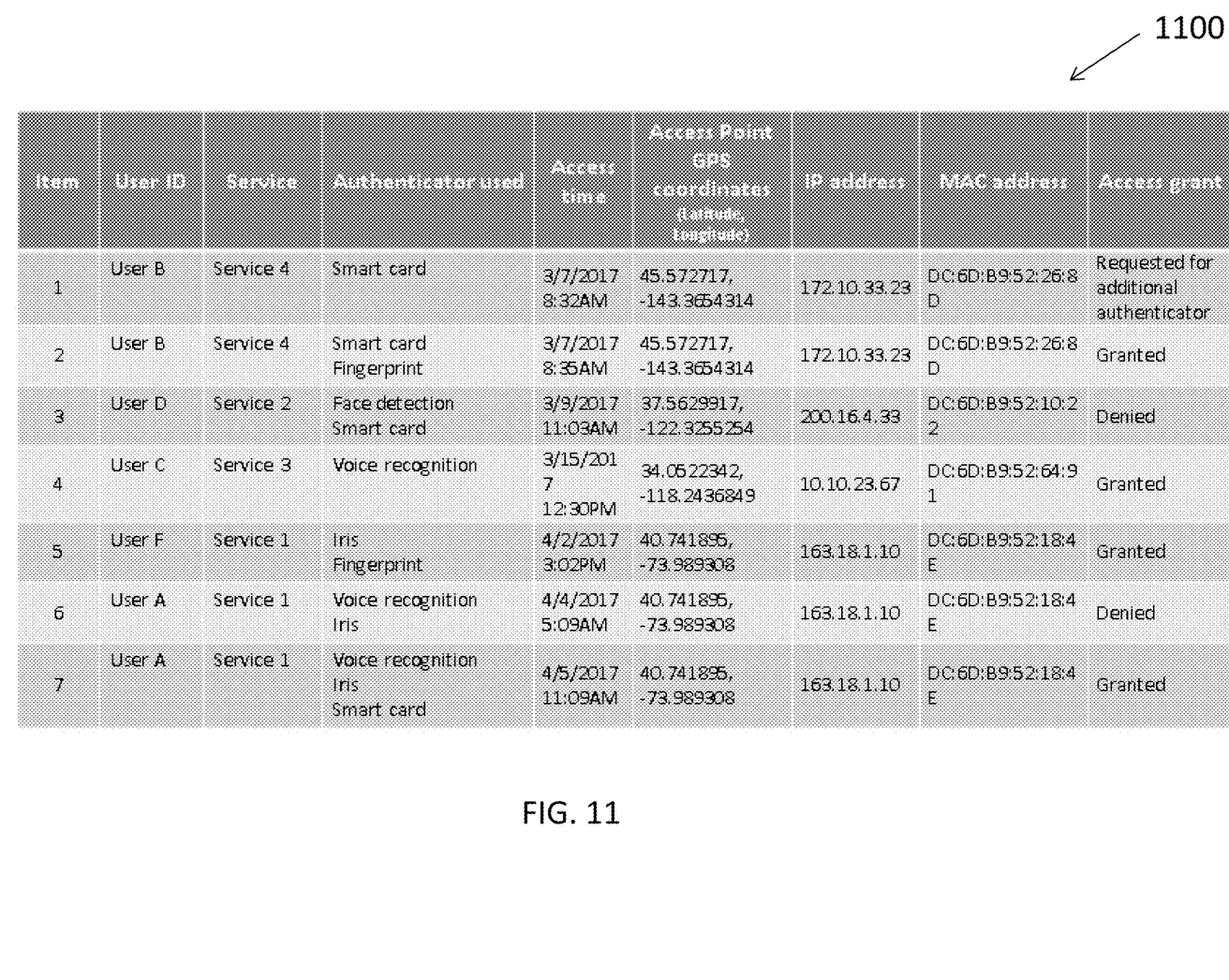
FIG. 11 is an illustration of an example of a table of user access logs with new system recommendation and service in accordance with an exemplary embodiment.

The above examples are captured as an example scenarios in tables 900, 1000, and 1100 as shown in FIGS. 9-11. In accordance with an exemplary embodiment, these tables illustrate randomness of the changes expected in a typical IT security environment and the adaptive nature of the authentication system proposed in this invention.

For example, as shown in table 900 as illustrated in FIG. 9, the changes in security level requirement changes at different service types or location due to either system anomalies or reduced enterprise requirements or changes in facilities or some other factors. For example, the security levels of Service 2 and 4 have increased while Service 3 has decreased. In addition, for example, the already high level of security at service 1 is now under increase monitoring.

Table 1000 of FIG. 10 illustrates example scenarios of the authentication system calculation of the new score index calculation for each user based on several factors. In accordance with an exemplary embodiment, for example, as shown in table 1000, each user case can be explained with some explanation of system analysis and derived recommendations. For example, as set forth in table 1000, system detection factors can include too many random location accesses, access limited to assigned site or service, consistent success in usage of multi-factor authentication, and frequent access to high risk with corresponding system recommendations, which can include, for example, increase request for multi-factor authentication and may need new authenticator registration, low authentication requirement, reduce authentication requirements for certain sites, and restrict access to normal business hours.

Table 1100 of FIG. 11 illustrates an example of new user log scenario with the new score index calculations with some notable behavior changes. For example, User D is now denied access to service 2 even after presenting multiple authentication factors due to increase security. User F can have controlled access to Service 1 while User A is restricted during out of office hours and require enhanced multi-factor authentication during normal office hours due to increased score index. Access to service 3 to user C is provided with very low authentication requirements since the score index is low and it is designated as default service for that particular user. User B now requires multi-factor authentication no matter which service is accessed due to increased score index and detection factors.

In accordance with an exemplary embodiment, the system 200 can use advanced machine learning, artificial intelligence and data analytic methods to process and analyze the captured user activity to train itself or perform incremental analysis for defining new authentication requirements, changes in level of authentication, and/or deciding or calculating a new score index of each of the one or more users.

In accordance with an exemplary embodiment, for example, the learning process of the system 200 proposed in this disclosure can consider several factors such as below to determine the incremental authentication requirements of users in a secured IT environment. For example, the learning process can include assigned factors, usage or derived factors, external factors, and system factors. For example, the assigned factors can include registered authenticators, default services, restricted hours, etc. The usage or derived factors can include, for example, location information (Global Positioning System (GPS), Media Access Control address (MAC address) or IP Address etc.), type of service, time of access, frequency of access, etc. The external factors can include increased security concerns due to geo-political conditions, natural calamities and vulnerability of service sites, increased hacking activity, increase malware/spyware, etc. The system factors can include system anomalies, power outage frequency, hardware (HW) or software (SW) instabilities etc.

In accordance with an exemplary embodiment, the machine-learning, artificial intelligence (AI) and data analytic methods or mechanism can include, but are not limited to, vector analysis, relationship mapping, clustering, anomaly detection, data visualization, regression analysis, neural networks, probabilistic methods etc.

In accordance with an exemplary embodiment, a non-transitory computer readable program code configured to execute a process of authenticating users for services is disclosed, the process comprising: registering one or more users in an authentication system; assigning a score index to each of the one or more users in the authentication system for one or more services, the score index representing a security level and corresponding authentication required to access each of the one or more services; inputting each request for services from the one or more users into the authentication system to continuously update the score index for each of the one or more users, each of the requests including one or more authenticators or biometric identifiers for the requested service; and requesting the one or more users to register one or more additional authenticators or biometric identifiers with the authentication system upon the score index for a user reaching of a predefined threshold value.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of authenticating users for services, the method comprising:
    registering one or more users in an authentication system;
    assigning a score index to each of the one or more users in the authentication system for one or more services, the score index representing a numerical value corresponding to a security level and corresponding authentication required to access each of the one or more services;
    inputting each request for services from a user of the one or more users into the authentication system to continuously update the score index for the user, each of the request for services including one or more authenticators or biometric identifiers for the requested service;
    calculating a new score index for the user after each request for services from the user, the new score index representing a change in the numerical value corresponding to the security level of the user for access to the one or more services calculated in real-time using a machine-learning algorithm, the machine-learning algorithm configured to calculate the new score index based on a combination of user activities and other user information; and
    requesting the user to enter one or more additional authenticators or biometric identifiers with the authentication system upon the numerical value of the new score index for the user reaching a predefined threshold value.

2. The method of claim 1, comprising:
    assigning a default score index to each of the one or more users based on one or more attributes, the default score index reflecting an initial security level for each of the one or more users.

3. The method of claim 1, comprising:
    receiving a request for a service from the user, the request including at least one authenticator or biometric identifier; and
    granting the user access to the service when the at least one authenticator or biometric identifier is sufficient based on the score index of the user and the authenticator or biometric identifier provides a credential or matches a stored authenticator or biometric identifier for the user.

4. The method of claim 1, wherein the at least one authenticator or biometric identifier comprises:
    at least one authenticator and at least one biometric identifier.

5. The method of claim 1, comprising:
    receiving a biometric identifier from a biometric authentication device, the biometric authentication device including at least one of the following:
    a sensor, a scanning device, or an electronic reader; and
    wherein the biometric identifier is at least one physiological characteristic of a user, and wherein the at least one physiological characteristic is selected from one or more of the following:
        fingerprints, palm veins, face recognition, DNA (or deoxyribonucleic acid), palm print, hand geometry, iris recognition, retina, and/or odor/scent.

6. The method of claim 1, wherein an authenticator of the one or more authenticators or biometric identifiers comprises:
    a keypad for a username and password ("password"), and/or a sensor, scanning device, or an electronic reader, which can read and/or obtain data from one or more of the following:
        a proximity cards, a radio-frequency identification (RFID) card, smart cards, and/or RSA tokens.

7. The method of claim 1, wherein the one or more services comprise one or more of the following:
    accessing a home or office;
    accessing a client device or a host device; and
    accessing a database on the client device or the host device.

8. The method of claim 1, comprising:
    calculating the new score index for the user based on at least a time of a request for a service and/or a location of the request for the service.

9. The method of claim 8, comprising:
    further calculating the new score index based on a type of service in the request for the service.

10. The method of claim 1, comprising:
    creating a biometric template for each of the one or more users with a biometric device, and forwarding the biometric template from the biometric device to the authentication system.

11. The method of claim 10, comprising:
processing the biometric template received from the biometric device to create a unique signature for each of the one or more users, and wherein the unique signature for each of the one or more users is used to grant or deny access to the one or more services.

12. A non-transitory computer readable program code configured to execute a process of authenticating users for services, the process comprising:
registering one or more users in an authentication system;
assigning a score index to each of the one or more users in the authentication system for one or more services, the score index representing a numerical value corresponding to a security level and corresponding authentication required to access each of the one or more services;
inputting each request for services from a user of the one or more users into the authentication system to continuously update the score index for the user, each of the request for services including one or more authenticators or biometric identifiers for the requested service;
calculating a new score index for the user after each request for services from the user, the new score index representing a change in the numerical value corresponding to the security level of the user for access to the one or more services calculated in real-time using a machine-learning algorithm, the machine-learning algorithm configured to calculate the new score index based on a combination of user activities and other user information; and
requesting the user to enter one or more additional authenticators or biometric identifiers with the authentication system upon the numerical value of the new score index for the user reaching a predefined threshold value.

13. An authentication system configured to grant authentication to a user of a service, the authentication system comprising:
a server having a processor configured to:
register one or more users in an authentication system;
assign a score index to each of the one or more users in the authentication system for one or more services, the score index representing a numerical value corresponding to a security level and corresponding authentication required to access each of the one or more services;
input each request for services from a user of the one or more users into the authentication system to continuously update the score index for the user, each of the request for services including one or more authenticators or biometric identifiers for the requested service;
calculate a new score index for the user after each request for services from the user, the new score index representing a change in the numerical value corresponding to the security level of the user for access to the one or more services calculated in real-time using a machine-learning algorithm, the machine-learning algorithm configured to calculate the new score index based on a combination of user activities and other user information; and
request the user to enter one or more additional authenticators or biometric identifiers with the authentication system upon the numerical value of the score index for the user reaching a predefined threshold value.

14. The authentication system of claim 13, wherein the processor is configured to:
receive a request for a service from the user, the request including at least one authenticator or biometric identifier; and
grant the user access to the service when the at least one authenticator or biometric identifier is sufficient based on the score index of the user and the authenticator or biometric identifier provides a credential or matches a stored authenticator or biometric identifier for the user.

15. The authentication system of claim 13, wherein the at least one authenticator or biometric identifier comprises:
at least one authenticator and at least one biometric identifier.

16. The authentication system of claim 13, wherein the processor is configured to:
receive a biometric identifier from a biometric authentication device, the biometric authentication device including at least one of the following:
a sensor, a scanning device, or an electronic reader; and
wherein the biometric identifier is at least one physiological characteristic of a user, and wherein the at least one physiological characteristic is selected from one or more of the following:
fingerprints, palm veins, face recognition, DNA (or deoxyribonucleic acid), palm print, hand geometry, iris recognition, retina, and/or odor/scent.

17. The authentication system of claim 13, wherein the authenticator comprises:
a keypad for a username and password ("password"), and/or a sensor, scanning device, or an electronic reader, which can read and/or obtain data from one or more of the following:
a proximity cards, a radio-frequency identification (RFID) card, smart cards, and/or RSA tokens.

18. The authentication system of claim 13, further comprising:
a biometric device configured to create a biometric template for each of the one or more users, and which forwards the biometric template from the biometric device to the processor of the authentication system; and
the processor is configured to:
process the biometric template received from the biometric device to create a unique signature for each of the one or more users, and wherein the unique signature for each of the one or more users is used to grant or deny access to the one or more services.

19. The method according to claim 1, wherein the change in the security level of the user for access to the one or more services is an increase in the security level for the user or a decrease in the security level for the user.

20. The method according to claim 19, wherein the increase in the security level of the user results in the user being required to enter one or more additional authenticators or biometric identifiers with the authentication system for the requested service.

* * * * *